United States Patent [19]

Okamura

[11] 4,195,531

[45] Apr. 1, 1980

[54] PRESSURE DETECTOR USING AN AVERAGING CIRCUIT

[75] Inventor: Kenji Okamura, Yokohama, Japan

[73] Assignee: Nissan Motor Company, Limited, Yokohama, Japan

[21] Appl. No.: 971,660

[22] Filed: Dec. 21, 1978

[30] Foreign Application Priority Data

Dec. 29, 1977 [JP] Japan ................................ 52-159505

[51] Int. Cl.² .............................................. G01L 9/00
[52] U.S. Cl. ......................................... 73/723; 73/115; 73/728; 123/119 A
[58] Field of Search ........................ 73/728, 115, 723; 123/119 A; 364/558, 811

[56] References Cited

U.S. PATENT DOCUMENTS

| 3,955,070 | 5/1976 | Suzuki et al. | 364/558 |
| 4,122,706 | 10/1978 | Schmidt | 73/115 |
| 4,142,495 | 3/1979 | Lahiff | 123/119 A |

*Primary Examiner*—Donald O. Woodiel
*Attorney, Agent, or Firm*—Lowe, King, Price & Becker

[57] ABSTRACT

A pressure detector comprising a spring-loaded diaphragm mounted in a housing to define a pressure chamber to which test fluid is introduced. A pulse generating element is provided to generate an electrical pulse in response to a displacement of the diaphragm when the fluid pressure in the pressure chamber exceeds a predetermined level. An averaging circuit is connected to the pulse generating element to convert the pulses into a signal having a voltage level representative of the mean value of the pressure variation.

5 Claims, 7 Drawing Figures

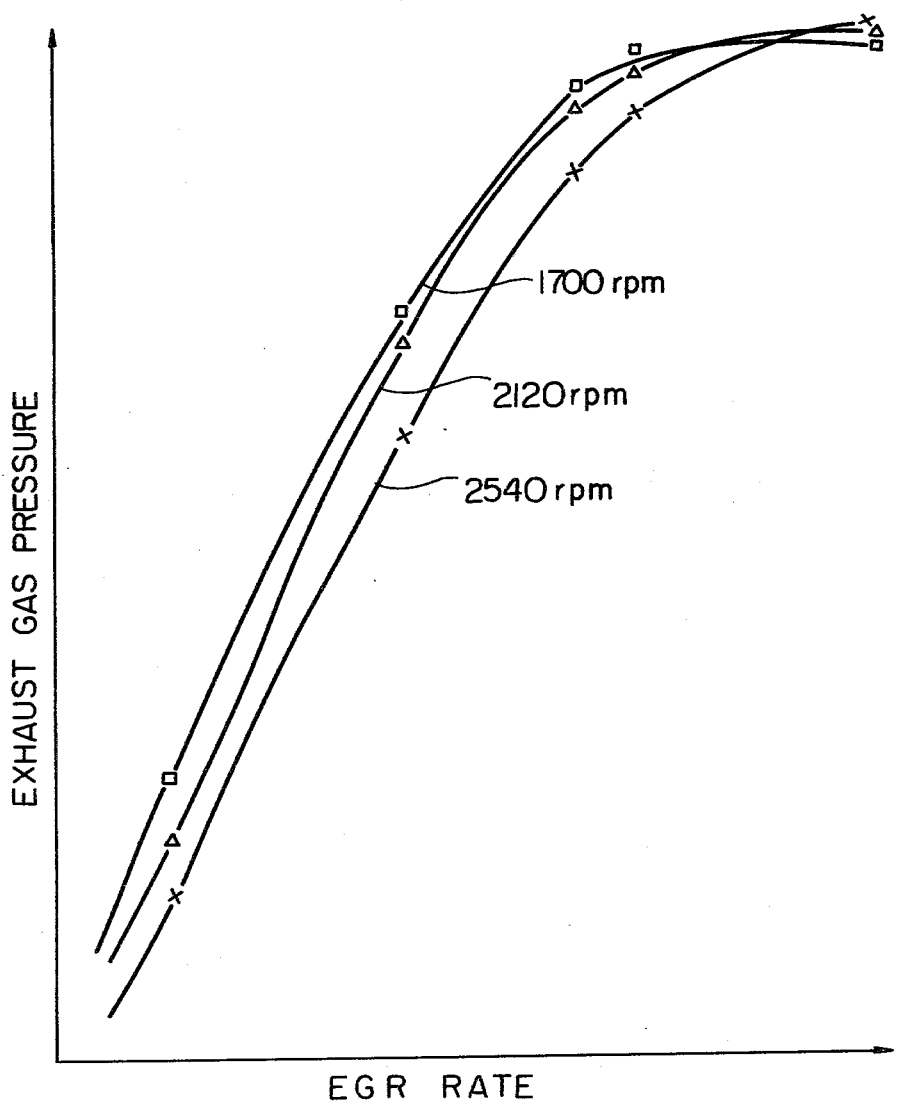

PRESSURE DETECTOR USING AN AVERAGING CIRCUIT

BACKGROUND OF THE INVENTION

The present invention relates generally to pressure detectors and specifically to a mean-value pressure detector which is particularly suitable for detecting the exhaust gas pressure of exhaust-gas recirculated internal combustion engines.

The conventional method of detecting the average value of a rapidly varying pressures of a fluid involves the use of an accumulator provided in the passage of a test fluid and an analog displacement type pressure detector connected to the output of the accumulator. Due to the averaging effect of the accumulator the output signal from the pressure detector is indicative of the mean value of pressure variations of a test fluid.

To meet the low emission standard exhaust gas recirculation (EGR) is extensively used in automobiles as a means of reducing the NOx components of the exhaust gases. Various methods of exhaust gas recirculation have hitherto been proposed. A prior art method involves the use of a pressure detector for detecting the exhaust gas pressure for proportionally controlling the rate of recirculated exhaust gases.

However, the employment of the conventional accumulator in the passage of the exhaust gas to act as a means for damping the rapidly varying pressure of the exhaust gases tends to offer resistance to the exhaust gas flow. It is therefore undesirable to incorporate the accumulator in a exhaust gas recirculation system of the type in which the EGR rate is proportional to the exhaust gas pressure. Furthermore, the accumulator occupies a substantial space which is disadvantageous for automotive applications where space is at a premium.

SUMMARY OF THE INVENTION

An object of the present invention is therefore to provide a pressure detector which offers substantially no resistance to the flow of a test fluid.

Another object of the invention is to provide a pressure detector which is compact and economical.

A further object of the invention is to provide a pressure detector which is suitable for application to exhaust gas recirculation of the type wherein the EGR rate is proportional to the exhaust gas pressure.

The present invention contemplates the use of an electrical averaging or damping circuit connected to the output of a pulse generator which is sensitive to the pressure of a test fluid to generate an electrical pulse when the fluid pressure is above a predetermined level so that duration of the pulse is proportional to the sensed pressure level. The generated pulses are converted by the averaging circuit into a voltage signal of which the magnitude is proportional to the duration of the pulses and hence to the mean value of the pressure variations.

Specifically, the pulse generator is comprised of a housing and a spring-loaded diaphragm mounted therein to define a pressure chamber to which the test fluid is introduced. The spring bias is so adjusted as to correspond to a predetermined pressure level which is intermediate the minimum and maximum pressure levels so that the diaphragm is caused to move when that pressure level is reached. A pulse generating element is provided to respond to the movement of the diaphragm by generating an electrical pulse of the duration proportional to the pressure value.

BRIEF DESCRIPTION OF THE DRAWINGS

The invention will be further described by way of example with reference to the accompanying drawings, in which:

FIG. 7 is a graphic illustration of the operating characteristic of the exhaust gas recirculation of FIG. 1.

DETAILED DESCRIPTION

Figure 1:
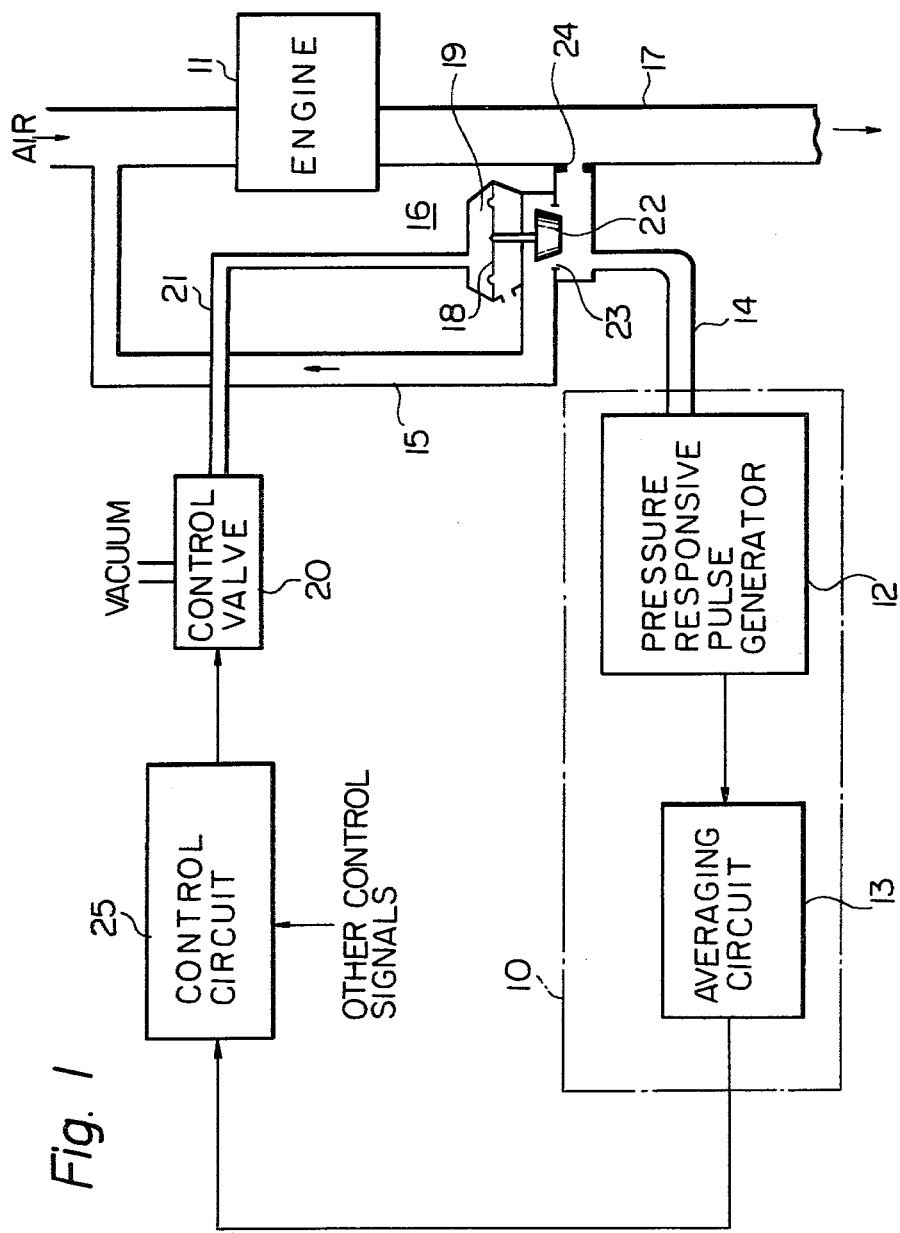
FIG. 1 is a schematic block diagram of an exhaust gas recirculation system incorporating an embodiment of the invention.

Referring now to FIG. 1, a pressure detector 10 according to the invention is shown incorporated in an exhaust gas recirculation (EGR) control circuit of an internal combustion engine 11. It is to be noted that the use of the detector 10 is most appropriate for applications where the average value of rapidly varying pressure is to be detected. Therefore, FIG. 1 illustrates an exemplary application of the pressure detector of the invention. The pressure detector 10 comprises a pressure responsive pulse generator 12 and an averaging circuit 13 connected to be responsive to the output signal from the pulse generator 12. The pressure responsive pulse generator 12 is connected by a conduit 14 to the EGR control passage 15 at a point upstream of an EGR control valve 16. For purposes of illustration, this control valve has a diaphragm 18 to define a vacuum chamber 19 connected to a vacuum control valve 20 via a conduit 21, and a valve member 22 secured to the diaphragm 18 to vary the area of orifice 23 so as to control the amount of recirculated exhaust gas through the manifold 17 and an orifice 24.

The pressure responsive pulse generator 12 generates electrical pulses whenever the pressure in the conduit 14 is above a predetermined pressure level so that the duration of the output pulses is proportional to the pressure in conduit 14. The averaging circuit 13 receives the pulses from the pulse generator 12 and generates a voltage signal of which the magnitude is proportional to the mean value of the varying pulse widths. This voltage signal is applied to a control circuit 25 such as microcomputers where other control signals are also applied to generate a control signal for activating the vacuum control valve 20 to control the vacuum pressure within the chamber 19 of the EGR control valve 16.

Figure 2:
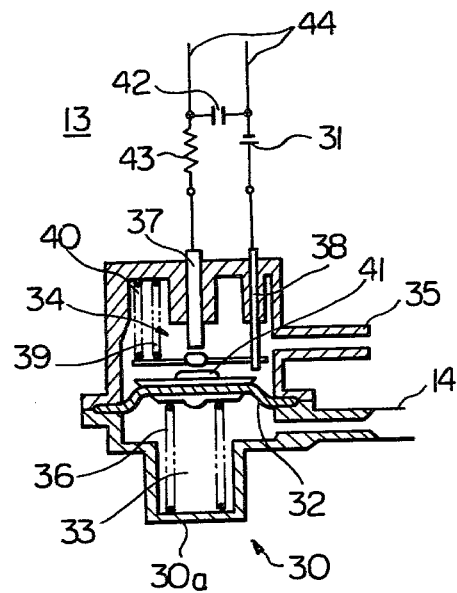
FIG. 2 is a first embodiment of the pressure detector of FIG. 1.

The detector 10 is shown in FIG. 2 as comprising a pressure responsive switch 30 and a DC voltage source or storage battery 31. The pressure switch 30 includes housing 30a a diaphragm 32 secured in the housing to define a pressure chamber 33 which is communicated to the conduit 14 and a chamber 34 which opens into the atmosphere through an opening 35. In the pressure chamber 33 is disposed a coiled spring 36 between the diaphragm 32 and the bottom wall of the switch housing. Into the upper chamber 34 extend switch terminals 37 and 38. A moving contact arm 39 is secured to a spring 40 and extends in a cantilever fashion between the lower end of the switch contact 37 and a raised contactor 41 which is secured to the upper face of the diaphragm 32. The free end of the cantilevered arm 39 is in electrical contact with the switch contact 38 at all times. The moving contact 39 is brought into electrical contact with the switch contact 37 when the pressure within the chamber 33 exceeds a level established by the spring 36.

The switch contacts 37 and 38 are electrically connected in a circuit through the DC voltage source 31 and an RC circuit including a capacitor 42 and a resistor 43 in series which forms the averaging circuit 13. During the time when the switch contacts 37 and 38 are brought into contact through the moving contact arm 39, the capacitor 42 is charged to develop a voltage thereacross proportional to the contact time. The time constant value of the RC circuit is so determined that the voltage across the capacitor 42 is representative of the mean value of the duration of electrical contact between the two switch contacts 37 and 38. The voltage signal so developed by the capacitor 42 is applied to the control circuit 25 through leads 44.

Figure 4:
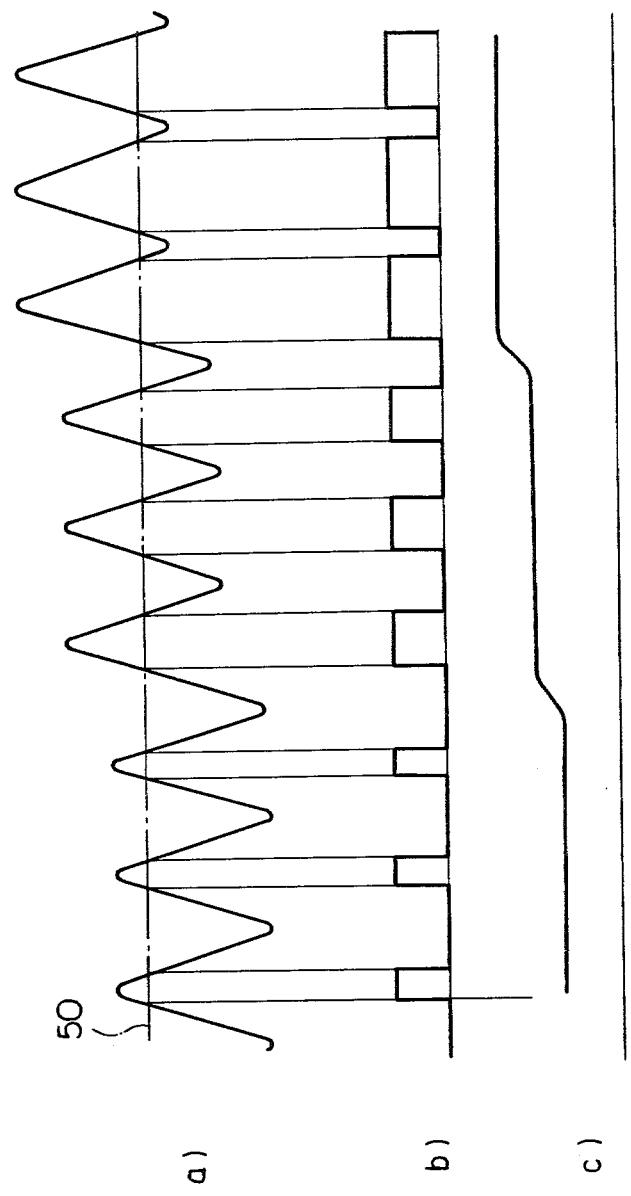
FIGS. 4a to 4c are illustrations of waveforms useful for describing the operation of the detector of FIG. 2.

Operation of the pressure detector 10 may be visualized as follows, referring to FIGS. 4a to 4c. The pressure within the chamber 33 is varied rapidly as shown in FIG. 4a and where it is assumed that the average value of the pressure increases with time. When the sensed pressure exceeds the predetermined level 50 a train of pulses as shown in FIG. 4b is developed across the terminals of the switch contacts 37 and 38. The waveform of this pulse train is smoothed by the averaging effect of the RC circuit so that the voltage across the capacitor 42 appears as shown schematically in FIG. 4c.

Figure 3:
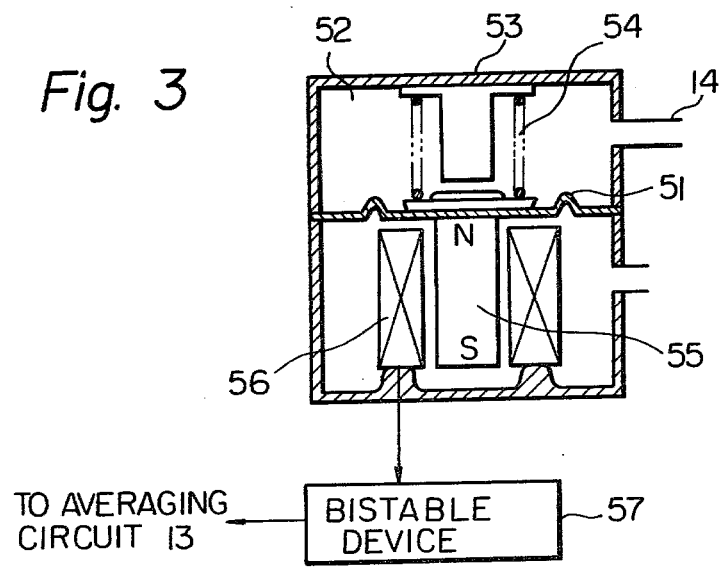
FIG. 3 is a second embodiment of the pressure detector of FIG. 1.
Figure 5:
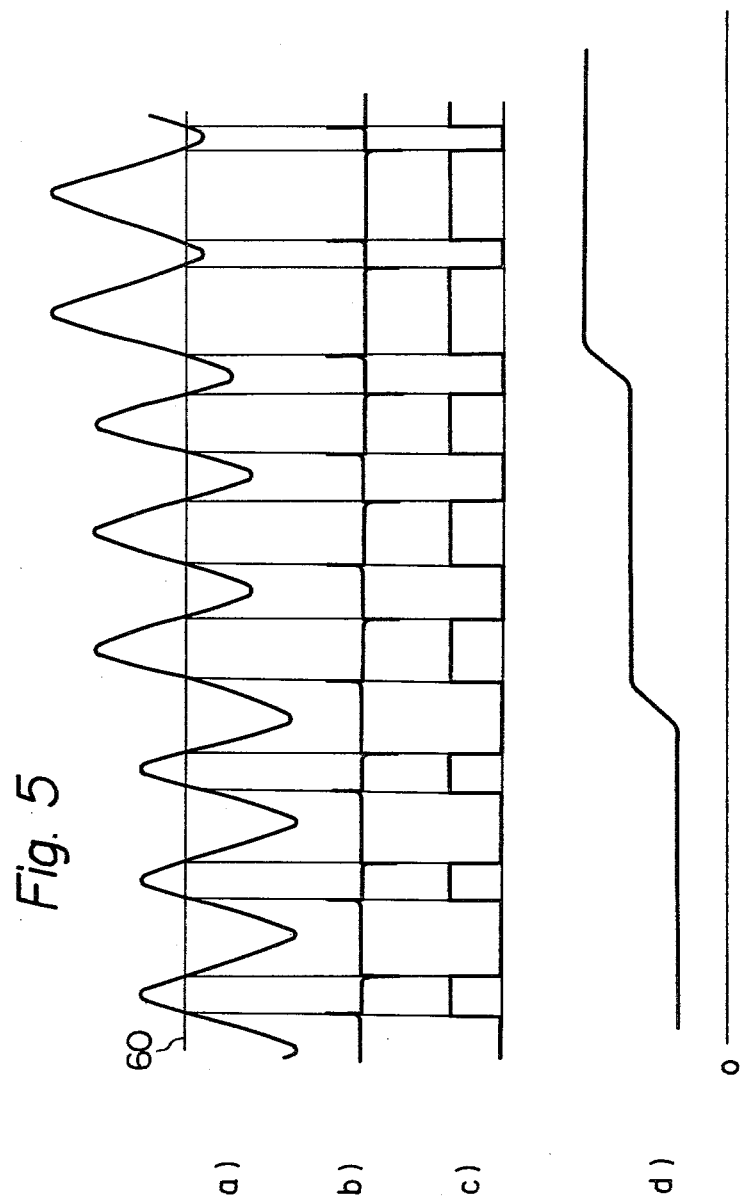
FIGS. 5a to 5d are illustrations of waveforms useful for describing the operation of the detector of FIG. 3.

FIG. 3 is an alternative embodiment of the pressure detector 10. In this embodiment, the pressure responsive pulse generator comprises a diaphragm 51 mounted to define a pressure chamber 52 with a housing 53, which chamber is communicated to the conduit 14. A coiled spring 54 is mounted between the diaphragm 51 and the top wall of the housing 53. A permanent magnet 55 is secured to the diaphragm 51 to be vertically movable therethrough. A cylindrical stator winding 56 is provided which encircles the moving magnet 55 to develop a voltage in response to each movement of the magnet whenever the pressure in the chamber 52 crosses a predetermined level 60 as set by the spring 43 (FIG. 5a). More specifically, when the pressure exceeds the preset level a positive going pulse is generated as the moving magnet moves downward and when the pressure falls below that level a negative going pulse is generated as it crosses the preset level in the opposite direction, FIG. 5b. The output signal from the winding 56 is supplied to a pulse forming circuit 57 which may be essentially comprised of a bistable device to generate a train of pulses as shown in FIG. 5c. The pulse duration is thus proportional to the duration of time when the pressure is above the preset level. The output of the pulse forming circuit 57 is coupled to the averaging circuit 13 to produce a voltage signal, FIG. 5d, representative of the average value of the varying durations of the pulse train.

Figure 6:
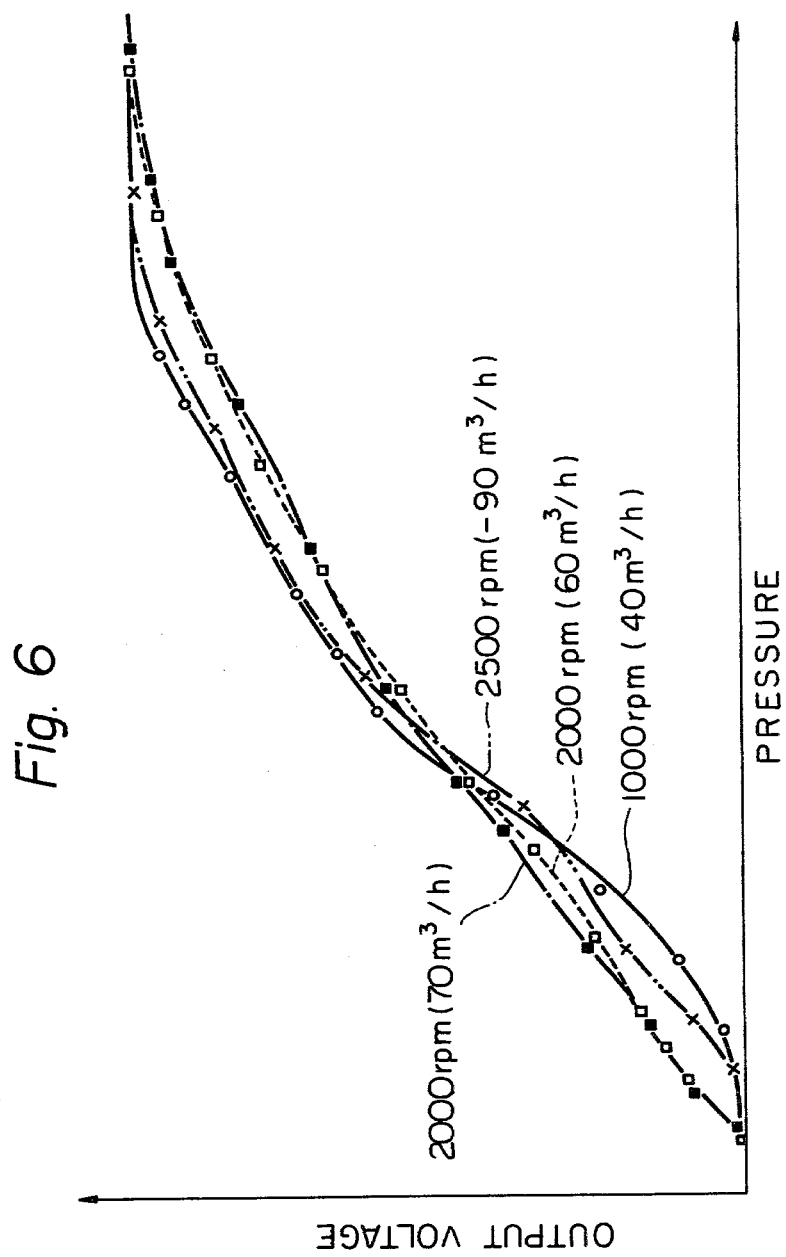
FIG. 6 is a graphic illustration of the operating characteristics of the pressure detector of the invention.

Experiments were conducted to determine the operating characteristics of the device of FIG. 2 using a 15-volt battery for the DC source 31 in the arrangement of FIG. 1. In FIG. 6 pressure variations at a point downstream of the orifice 24 are plotted as a function of the voltage developed across the capacitor 42 for various engine speeds. In these experiments, the spring 36 is so adjusted that the switch contacts 37 and 38 are brought into contact when the pressure level reaches a reference level of 20 mm Hg and the time constant of the RC circuit is selected at 0.5 seconds. As shown in FIG. 6 the output voltage of the pressure detector 10 is substantially linear as a function of the sensed pressure over a substantial range of pressures. FIG. 7 illustrates the operating characteristics of the EGR controlled internal combustion engine 10 using the pressure detector of the invention. As shown, the rate of EGR varies in proportion to the sensed pressure variation over the substantial range of exhaust gas pressures.

What is claimed is:

1. A pressure detector comprising:
   a housing;
   a diaphragm in said housing to define a chamber with the walls of said housing, said chamber being in communication with a source of fluid;
   means for urging said diaphragm so that the same moves when the magnitude of the pressure of fluid in said chamber reaches a predetermined level;
   means for generating an electrical pulse in response to the movement of said diaphragm so that the duration of said pulse is proportional to the pressure of fluid in said chamber; and
   means for converting the electrical pulses into a voltage signal of which the magnitude is proportional to a mean value of the durations of said pulses.

2. A pressure detector as claimed in claim 1, wherein said pulse generating means comprises a pair of stationary contacts, a moving contact responsive to the movement of said diaphragm to establish an electrical contact between said stationary contacts, and a DC voltage source connected between said stationary contacts through said pulse converting means.

3. A pressure detector as claimed in claim 2, wherein said pulse converting means comprises a resistor and a capacitor connected in series through said DC voltage source to said stationary contacts to develop a voltage across said capacitor representative of a mean value of voltages developed across said stationary contacts.

4. A pressure detector as claimed in claim 1, wherein said pulse generating means comprises a magnet secured to said diaphragm, a winding adjacent to said magnet to develop a signal in response to the movement of said magnet with said diaphragm and a bistable device for generating an electrical pulse in response to successive ones of said signal.

5. A pressure detector as claimed in claim 1 for an exhaust-gas recirculated internal combustion engine, wherein said chamber of the pressure detector is communicated to the exhaust manifold of said engine to permit said converting means to generate a voltage signal representative of the mean value of the pressure of the exhaust gases in said manifold, said voltage signal being applied to an exhaust gas recirculation control valve of said internal combustion engine as a feedback signal.

* * * * *